UNITED STATES PATENT OFFICE.

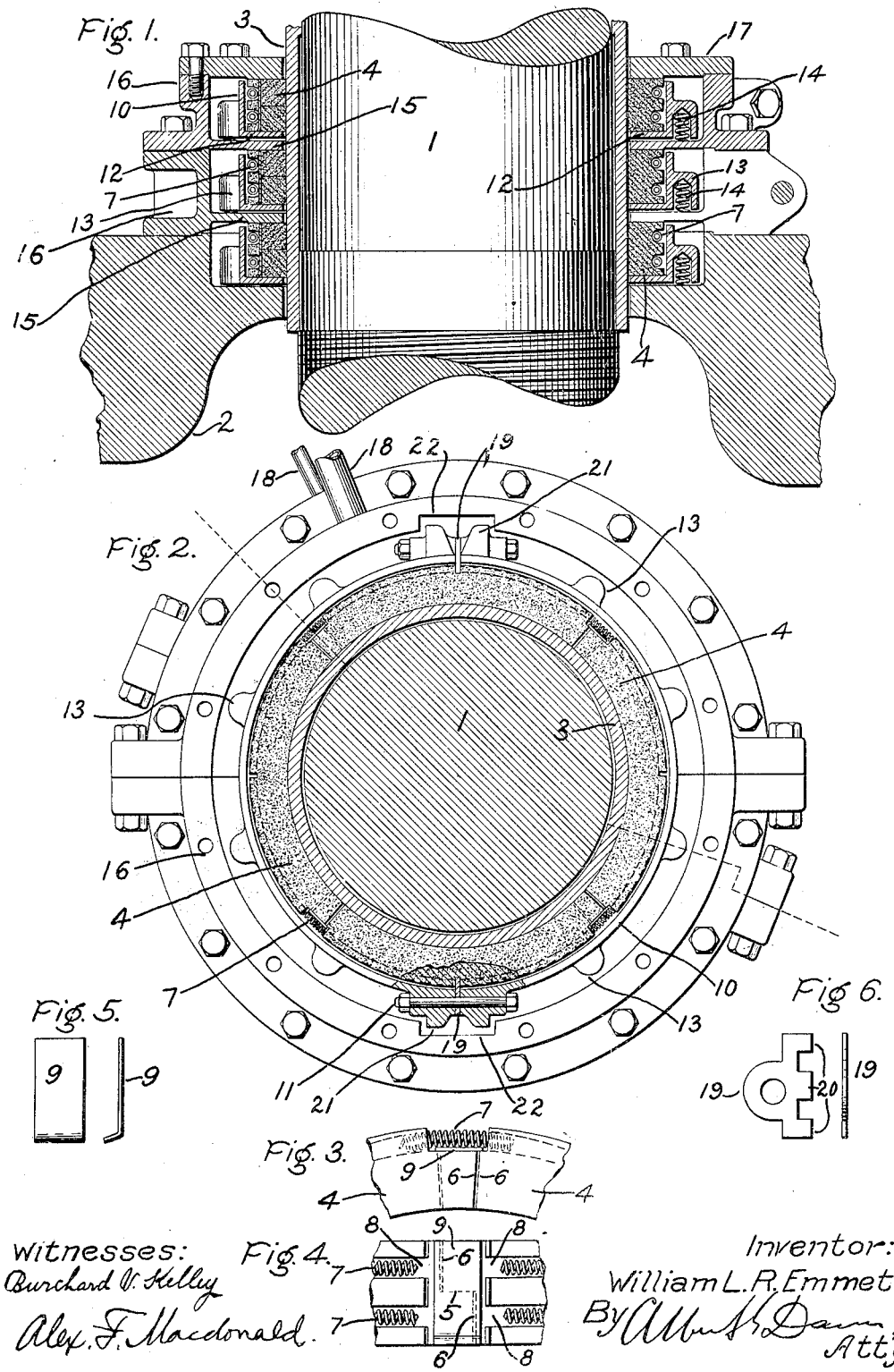

WILLIAM L. R. EMMET, OF SCHENECTADY, NEW YORK, ASSIGNOR TO GENERAL ELECTRIC COMPANY, A CORPORATION OF NEW YORK.

PACKING-RING FOR SHAFTING.

No. 818,385.   Specification of Letters Patent.   Patented April 17, 1906.

Application filed June 28, 1905. Serial No. 267,324.

*To all whom it may concern:*

Be it known that I, WILLIAM L. R. EMMET, a citizen of the United States, residing at Schenectady, in the county of Schenectady and State of New York, have invented certain new and useful Improvements in Packing-Rings for Shafting, of which the following is a specification.

This invention relates to devices for making a steam-tight joint at the point where a rotating shaft passes through a casing in which steam or other elastic fluid is confined under pressure.

It consists in a segmental ring of carbon or other suitable material held stationary in a chamber and fitting the shaft closely. A stationary abutment is provided against which the ring is forced to prevent the escape of the elastic fluid from said chamber.

In the accompanying drawings, Figure 1 is a sectional elevation of an upright shaft provided with my improved packing. Fig. 2 is a cross-section of the same. Fig. 3 is a top plan view of a joint between two segments of a packing-ring on an enlarged scale. Fig. 4 is a side elevation of the same, and Figs. 5 and 6 show front and edge views of two plates that are used in the complete structure.

The shaft 1 is shown as passing up through an aperture in a casing 2, in which steam or other elastic fluid is confined under pressure—as, for instance, in a steam-turbine. The shaft is preferably provided with a sleeve 3, which has a smooth cylindrical outer surface. Fitting snugly to this surface is a packing-ring, or, if desired, a plurality of such rings arranged in a tier. The rings are composed of carbon or some similar material and are molded in segments 4, as shown. The abutting ends of the segments are rabbeted together, the meeting surfaces 5 (see dotted line, Fig. 4) of the joints being on planes of revolution. The end surfaces 6 of the segments do not quite touch in order to permit the segments to be drawn closely against the shaft by an elastic band, such as the garter spring or springs 7, embedded in a groove or grooves 8 in the periphery of the ring.

A wide groove is cut across the ring at each joint to permit the application thereto of a break-joint plate 9, which covers both of the radial spaces between the adjacent ends 6 of the segments, as clearly shown in Figs. 3 and 4. The transverse groove in which the plate is received is preferably of the same depth as the grooves 8, so that the springs 7 can pass over said plate.

Each ring is inclosed in a metallic holder, such as the band 10, made, preferably, in segments clamped together by bolts 11. The band has an inwardly-extending flange 12, on which the packing-ring rests. It is also provided with a plurality of sockets 13, in which are seated springs 14, which urge the holder and its ring upward against a stationary abutment, such as an inwardly-extending flange 15 on a collar 16, surrounding the shaft and secured to the casing. The upper ring bears against a plate 17, bolted to the upper collar. The spaces below this plate and the flanges form annular chambers to house the packing-rings. The rings are held up against seats faced off on the under side of said plate and flanges, and the first or lowest ring is held there not only by the springs 14, but also by the pressure of the elastic fluid in the casing, which has free access to the chamber in which this first ring is located. If desired, live steam may also be led into the other chambers by the pipes 18 in order to insure a tight joint between the rings and their seats.

The rings are stationary, and the shaft and its sleeve rotate inside of them. In order to hold the rings stationary, one or more anchors are provided, preferably strips of metal 19, clamped between the abutting ends of the segments of the holders and having prongs 20, which enter slots in the rings, the springs 7 passing between said prongs. The holders are in turn prevented from rotating with the shaft by means of lugs 21 thereon, which enter recesses 22 in the inside of the collars.

It will be seen that the tier of rings forms an effectual packing for the shaft. Should any steam leak past the first ring, it will be stopped by those above it.

What I claim as new, and desire to secure by Letters Patent of the United States, is—

1. A packing-ring for shafts composed of segments having their ends rabbeted together on a plane of revolution, and a break-joint plate covering the outer ends of the radial spaces between the ends of said segments.

2. A packing-ring for shafts composed of segments having their ends rabbeted together on a plane of revolution, a circumferential groove in its periphery, an elastic band in said groove, and a break-joint plate covering the outer ends of the radial spaces between the adjacent ends of said segments and held in place by said band.

3. A packing-ring for shafts composed of segments having their ends rabbeted together on a plane of revolution, a circumferential groove in its periphery and a transverse groove at each joint, a garter-spring in the circumferential groove, and break-joint plates in the transverse grooves under said spring.

4. The combination with a segmental packing-ring, of a holder composed of a band having an inwardly-extending flange, and provided with sockets to receive springs, for urging said holder in a direction parallel with its axis.

5. The combination with a segmental packing-ring, of a holder for the same made in segments, and anchors for said ring clamped between the segments of said holder.

6. The combination with a segmental packing-ring, of a holder for the same made in segments, and a plate clamped between said segments and having prongs entering said packing-ring.

In witness whereof I have hereunto set my hand this 27th day of June, 1905.

WILLIAM L. R. EMMET.

Witnesses:
BENJAMIN B. HULL,
HELEN ORFORD